United States Patent
Lee et al.

(10) Patent No.: US 12,333,180 B2
(45) Date of Patent: Jun. 17, 2025

(54) METHODS AND APPARATUS FOR DATA PROCESSING AND MANAGEMENT IN ERASURE-CODED MULTI-CLOUD STORAGE SYSTEMS

(71) Applicant: Ng-Kwok Sing, Shatin (HK)

(72) Inventors: Pak-Ching Lee, Shatin (HK); Hoi-Wan Chan, Shatin (HK); Shakeel Salamat Ullah, Shatin (HK); Ng-Kwok Sing, Shatin (HK)

(73) Assignee: Ng-Kwok Sing, Shatin (HK)

( * ) Notice: Subject to any disclaimer, the term of this patent is extended or adjusted under 35 U.S.C. 154(b) by 28 days.

(21) Appl. No.: 18/321,367

(22) Filed: May 22, 2023

(65) Prior Publication Data
US 2024/0393975 A1 Nov. 28, 2024

(51) Int. Cl.
*G06F 11/00* (2006.01)
*G06F 3/06* (2006.01)
*G06F 11/10* (2006.01)

(52) U.S. Cl.
CPC .......... *G06F 3/0655* (2013.01); *G06F 3/0604* (2013.01); *G06F 3/067* (2013.01); *G06F 11/1044* (2013.01)

(58) Field of Classification Search
CPC .............. G06F 11/1044; G06F 11/1048; G06F 11/1056; G06F 11/106
See application file for complete search history.

(56) References Cited

FOREIGN PATENT DOCUMENTS

| CN | 114138526 A | * 3/2022 |
|----|-------------|----------|
| CN | 115470035 A | * 12/2022 |

* cited by examiner

*Primary Examiner* — Katherine Lin
(74) *Attorney, Agent, or Firm* — Muncy, Geissler, Olds & Lowe, P.C.

(57) ABSTRACT

A distributed storage system includes one or multiple proxies, a metadata store, multiple agents, and multiple data repositories, which provisions storage space within a cloud or a cloud region from one or multiple cloud storage services. A proxy encodes data objects to generate coded chunks for fault tolerance and security, stores coded chunks in data repositories via agents, and persists the states and metadata of data objects in the metadata store. An agent manages the coded chunks in one or multiple data repositories and encodes coded chunks during data repair. The system utilizes data processing and management methods for improved data repair and management, including (i) hierarchical data repair for reducing both the cross-cloud network bandwidth usage and the data repair time, (ii) various data management configurations across objects, and (iii) extensions for new data management mechanisms and new cloud storage services.

10 Claims, 16 Drawing Sheets

```
typedef unsigned short ChunkId;

typedef struct Chunk {
  ChunkId id;
  unsigned char* data;
  unsigned int size;
  unsigned char* version;
  unsigned char* checksum;
} Chunk;

typedef unsigned char* CodingState;

typedef struct DecodingPlan {
  unsigned char* matrix;
  unsigned int matrixSize;
  vector<ChunkId> inputChunks;
} DecodingPlan;
```

FIG. 8

```
class CodingScheme {
public:

/** class constructor **/
  CodingScheme (unsigned char n, unsigned char k, bool
    useHierRepair);

/** coding operations **/
  bool Encode(unsigned char* data, unsigned int size, vector<
    Chunk> stripe, unsigned char* state);
  bool Decode(vector<Chunk> input, unsigned char* decodedData,
    unsigned int decodedLength, DecodingPlan plan, CodingState
    state, bool isRepair, vector<ChunkId> targets);
  bool Plan4Decode(vector<ChunkId> failed, DecodingPlan plan,
    CodingState state, bool isRepair);

/** information for chunk placement **/
  int NumChunksPerNode();
  int NumChunksInStripe();
  int CodingStateSize();

```
class StorageDriver {
public:

/** chunk operations **/
    bool PutChunk(Chunk chunk);
    bool GetChunk(Chunk chunk);
    bool DeleteChunk(Chunk chunk);
    bool RevertChunk(Chunk chunk);
    bool VerifyChunk(Chunk chunk);

/** storage statistics **/
    unsigned long int GetUsage();
    unsigned long int GetCapacity();

1: procedure WRITEOBJECT(object)
2:     Lock the object metadata in the metadata store
3:     $meta \leftarrow$ the object metadata in the metadata store
4:     $meta' \leftarrow \emptyset$                              ▷ new object metadata
5:     Divide object data into data units
6:     for each data unit $D$ of length $|D|$ do
7:        $chunks \leftarrow \emptyset, state \leftarrow \emptyset$            ▷ chunk and coding state
8:        $Encode(D, |D|, chunks, state)$                    ▷ encode
9:        Select the data containers for $chunks$
10:       for each chunk $c$ in $chunks$ do                ▷ store chunks
11:           Trigger $PutChunk(c)$ on the corresponding data container via an agent
12:       end for
13:       if not all chunks in $chunks$ are written then
14:          for each $c'$ in $chunks$ and $meta'$ do
15:            if $c'$ has no previous version then
16:               Trigger $DeleteChunk(c')$ on the corresponding data container via an agent
17:            else
18:               Trigger $RevertChunk(c')$ on the corresponding data container via an agent
19:            end if
20:          end for
21:          Unlock the object metadata
22:          return false
23:       end if
24:       Append the metadata of $chunks$ and $state$ to $meta'$
25:     end for
26:     Update the version identifier in $meta'$ based on $meta$
27:     Update $meta$ to the metadata store             ▷ persist metadata
28:     Unlock the object metadata
29:     return true
30: end procedure

FIG. 11

```
 1: procedure READOBJECT(object)
 2:     meta ← the object metadata in the metadata store
 3:     for each stripe in meta do
 4:         Check the liveness of the data containers of all coded chunks
 5:         failed ← all chunks whose data containers are not alive           ▷ lost chunks
 6:         plan ← ∅                                                          ▷ decoding plan
 7:         state ← coding state in meta                                      ▷ coding state
 8:         Plan4Decode(failed, plan, state, false)                           ▷ prepare a plan
 9:         for each chunk c in plan.inputChunks do                           ▷ collect chunks
10:             Trigger GetChunk(c) on the corresponding data container via an agent
11:         end for
12:         chunks ← all collected chunks                                     ▷ collected chunks
13:         dataUnit ← ∅, dlength ← 0                                         ▷ decoded data and its length
14:         Decode(chunks, dataUnit, dlength, plan, state, false)             ▷ decode
15:         Append dataUnit to the data buffer of object
16:         Increment the data buffer length of object by dlength
17:     end for
18: end procedure
```

FIG. 12

```
 1: procedure REPAIROBJECT(object)
 2:     Lock the object metadata in the metadata store
 3:     meta ← the object metadata in the metadata store
 4:     for each stripe S in meta do
 5:         Check the liveness of the data containers of all coded chunks
 6:         failed ← corrupted chunks marked in meta and lost chunks
 7:         plan ← ∅,  state ← coding state in meta
 8:         Plan4Decode(failed, plan, state, true)                    ▷ prepare a plan
 9:         if |failed| = 1 and hierarchical repair is enabled then
10:             for each set of coded chunks by their respective data repositories do
11:                 Group the chunks into g and their corresponding coefficients in plan.matrix into r
12:                 Trigger AGENTENCODECHUNKS(g, r) at the agent of the respective data repository
13:             end for
14:         else                                                      ▷ conventional repair
15:             for each chunk c in plan.inputChunks do
16:                 Trigger GetChunk(c) on the corresponding data container via an agent
17:             end for
18:         end if
19:         chunks ← all collected chunks                              ▷ collected chunks
20:         chunkBuf ← ∅,  cblength ← 0                                ▷ repaired data and its length
21:         Decode(chunks, chunkBuf, cblength, plan, state, true, failed)   ▷ decode
22:         Select the original data container for each corrupted chunk
23:         Select a new data container for each lost chunk
24:         for each chunk c in chunkBuf do                            ▷ store repaired chunks
25:             Trigger PutChunk(c) on the corresponding data container via an agent
26:         end for
27:         Update the metadata of S in meta
28:     end for
29:     Update meta to the metadata store                              ▷ update metadata
30:     Unlock the object metadata
31: end procedure
32: procedure AGENTENCODECHUNK(g, r)
33:     chunks ← ∅                                                     ▷ coded chunks
34:     for each chunk c in g do
35:         Trigger GetChunk(c) on the corresponding data container
36:         Add c to chunks
37:     end for
38:     Encode chunks into a partial decoded chunk e using r
39:     return e
40: end procedure
```

FIG. 13

```
 1: procedure REPAIROBJECT(object)
 2:     Lock the object metadata in the metadata store
 3:     meta ← the object metadata in the metadata store
 4:     for each stripe S in meta do
 5:         Check the liveness of the data containers of all coded chunks
 6:         failed ← corrupted chunks marked in meta and lost chunks
 7:         plan ← ∅,  state ← coding state in meta
 8:         Plan4Decode(failed, plan, state, true)                    ▷ prepare a plan
 9:         if |failed| = 1 and hierarchical repair is enabled then
10:             G ← ∅                          ▷ mapping of coded chunk groups and matrices
11:             for each group of coded chunks by their respective data repositories do
12:                 Group the chunks into g and their corresponding coefficients in plan.matrix into r
13:                 Add a mapping of g and r to G
14:             end for
15:             m ← a decoding matrix for partial decoded chunks
16:             dcid ← ∅                                    ▷ selected data container identifier
17:             if the failed chunk is corrupted then
18:                 dcid ← the identifier of the original data container of the chunk to repair
19:             else
20:                 dcid ← an identifier of a newly selected data container
21:             end if
22:             Trigger AGENTREPAIRCHUNK(G, m, dcid) at the agent that manages the data container with identifier dcid            ▷ delegate repair to an agent
23:             Update the metadata of S in meta
24:         else
25:             Fall back to the conventional data repair flow
26:         end if
27:     end for
28:     Update meta to the metadata store                        ▷ update metadata
29:     Unlock the object metadata
30: end procedure
31: procedure AGENTREPAIRCHUNK(G, m)
32:     pdchunks ← ∅                                          ▷ partial decoded chunks
33:     for each chunk g in G do
34:         pdchunks ← AGENTENCODECHUNKS(g, r) at the agent of the respective data repository
35:     end for
36:     Apply m on pdchunks to generate the repaired chunk rchunk  ▷ decode the repaired chunk
37:     Trigger PutChunk(rchunk) on the data container with identifier dcid  ▷ store the repaired chunk
38:     return true
39: end procedure
40: procedure AGENTENCODECHUNK(g, r)
41:     chunks ← ∅                                                ▷ coded chunks
42:     for each chunk c in g do
43:         Trigger GetChunk(c) on the corresponding data container
44:         Add c to chunks
45:     end for
46:     Encode chunks into a partial decoded chunk e using r
47:     return e
48: end procedure
```

FIG. 14

```
1: procedure DELETEOBJECT(object)
2:     Lock the object metadata in the metadata store
3:     meta ← the object metadata in the metadata store
4:     Remove the object metadata in the metadata store
5:     for each stripe S in meta do
6:         Check the liveness of the data containers of all coded chunks
7:         for each alive chunk c in S do
8:             Trigger DeleteChunk(c) on the corresponding data container via an agent
9:         end for
10:    end for
11:    Unlock the object metadata
12: end procedure
```

FIG. 15

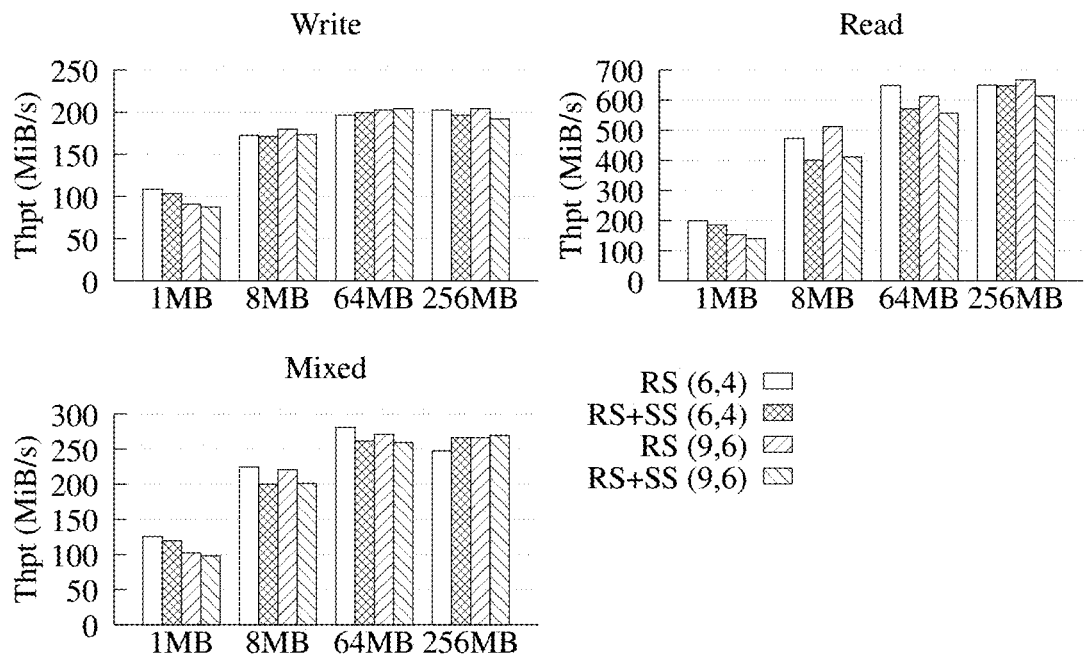

FIG. 16

METHODS AND APPARATUS FOR DATA PROCESSING AND MANAGEMENT IN ERASURE-CODED MULTI-CLOUD STORAGE SYSTEMS

FIELD OF THE INVENTION

The present disclosure relates to the computing field, and more specifically to data processing and management of data storage systems.

BACKGROUND

Modern software applications adopt a multi-cloud architecture that leverages compute and storage resources across multiple private and/or public clouds for improved service reliability and availability. A cloud is a managed cluster of computing servers that are interconnected using networking technologies, providing one or more services to software applications including computation and data storage. Examples of clouds include Amazon Web Services, Microsoft Azure, Google Cloud Platform, and IBM Cloud. Multi-cloud storage systems are designed to manage data over an aggregate of cloud storage services and provide a unified storage view to software applications, thereby eliminating the need to design and add extra data management logic to handle multiple cloud storage services in software applications.

On system architecture, a multi-cloud storage system can be an independent system or platform that provides storage services to software applications via well-known data storage protocols, e.g., POSIX, NFS, and Amazon Simple Storage Service (Amazon S3). Such a design allows software applications to seamlessly access data that is striped across multiple clouds.

To ensure that data remains available and recoverable in the event of cloud failure patterns, multi-cloud storage applies replication or erasure coding on the original data to generate redundant data before dispersing both the original and redundant data across multiple cloud storage services. The two reliability mechanisms make a trade-off between storage overhead and repair bandwidth. Specifically, replication incurs high storage overhead but low repair bandwidth, whereas erasure coding has low storage overhead yet high repair bandwidth. Also, erasure coding entails the computation overhead in the encoding of data to generate data redundancy. Such resource overhead can also increase the operational cost and reduce the storage performance for data access and repair.

On data security, multi-cloud storage can use traditional key-based cryptographic encryption (e.g., AES-256) or combine data reliability mechanisms with secret sharing to guarantee data confidentiality and integrity. Compared with traditional cryptographic encryption, secret sharing leverages the service diversity of clouds to eliminate explicit encryption key management.

One challenge in multi-cloud storage is to keep the operational cost low while maintaining data reliability. Although multi-cloud storage can apply erasure coding for low storage overhead, the higher volume of data transferred during data repair of erasure coding can incur a surge in operational cost when compared with replication. The surge in operational cost is particularly significant in multi-cloud storage that connects public clouds when compared to traditional distributed data storage that is deployed in a single cloud, since data transfer across clouds is often charged for cloud usage fees. Thus, implementing an efficient data repair method is vital to reducing the overall operational cost of multi-cloud storage.

In addition, the diversity of application storage workloads and cloud storage services poses another challenge to multi-cloud storage in enabling transparent storage access handling without impacting application logic. For example, different application storage workloads can impose various storage requirements, such as bandwidth-efficient outsourced storage archives for data backups and scalable storage-efficient data repositories for big data applications. Also, storage services in private and public clouds can present heterogeneous environments to multi-cloud storage, such as different storage access semantics. Thus, an effective and flexible data processing and storage management design is also important for addressing the heterogeneity in multi-cloud storage.

SUMMARY

This disclosure provides apparatus and methods on data management for (i) hierarchical data repair for reducing network bandwidth usage and data repair time, (ii) multiple data-object-level data management configurations to satisfy different storage requirements, and (iii) extensions of new cloud storage services and data management mechanisms on reliability and security to adapt the diversity of clouds.

The first embodiment disclosed herein is a data processing and management apparatus comprising one or more proxies, a metadata store, multiple agents, and multiple data repositories. A proxy encodes data objects into coded chunks for fault tolerance and security, stores coded chunks in data repositories via agents, and persists the states and metadata of data objects to the metadata store. Each data repository contains storage space provisioned from cloud storage services within a cloud or a cloud region as data containers. For each data repository, an agent is deployed in a cloud to manage the coded chunks in the repository and encode coded chunks during data repair. Both the proxies and agents comprise several modular units that realize the functionalities in the system operation flows, including reliability and security mechanisms, coded chunk placement, access of coded chunks in data containers, and inter-entity communication. The apparatus manages data objects using namespaces for logical data storage isolation.

The second embodiment disclosed herein is a data processing method on hierarchical data repair. Based on the first embodiment that the groups of coded chunks are stored in different data repositories, the hierarchical data repair method comprises the following steps to reconstruct a lost coded chunk: (i) the proxy selects the coded chunks to participate in the repair and informs the corresponding agents about the repair operation: (ii) each agent, which is deployed in a cloud, encodes the selected coded chunks within its data repository to generate one or multiple partial decoded chunks; and (iii) the proxy (or the agent of the data repository where the reconstructed lost chunk is stored) collects the partial decoded chunks and decodes the lost coded chunk from the collected partial decoded chunks.

The third embodiment disclosed herein is a data processing and management method that enables multiple data-object-level data management configurations. The definition of data management configuration includes the data management mechanism and parameters on reliability and security for data processing and storage management decisions.

The fourth embodiment disclosed herein is a data processing and management method that utilizes a data processing operation interface and a data container access interface to enable the extensions of new data management mechanisms and new cloud storage services. The data processing operation interface and the data container access interface define the data communication workflows among system entities on essential data processing procedures.

BRIEF DESCRIPTION OF THE DRAWINGS

For a more complete understanding of the invention, reference is made to the following description and accompanying drawings, in which:

FIG. 8 is a list of primitives utilized in a data processing and management method according to an embodiment of the presented invention;

FIG. 9 is a list of the data processing operation interface calls utilized in a data processing and management method according to an embodiment of the presented invention;

FIG. 10 is a list of data container access interface calls utilized in a data processing and management method according to an embodiment of the presented invention;

FIG. 11 is a pseudo algorithm of a data processing and management method for storing data to a data management system according to an embodiment of the presented invention;

FIG. 12 is a pseudo algorithm of a data processing and management method for retrieving data in a data management system according to an embodiment of the presented invention;

FIG. 13 is a pseudo algorithm of a data processing and management method for recovering data in a data management system according to an embodiment of the presented invention;

FIG. 14 is a pseudo algorithm of a data processing and management method for recovering data in a data management system according to an embodiment of the presented invention;

FIG. 15 is a pseudo algorithm of a data processing and management method for deleting data in a data management system according to an embodiment of the presented invention;

FIG. 16 is a performance evaluation result of a data management apparatus implementation according to an embodiment of the presented invention;

DETAILED DESCRIPTION

Distributed data storage systems, including but not limited to multi-cloud storage systems, apply erasure coding on data for fault tolerance with less storage overhead than replication, at the expense of higher data repair bandwidth.

The following overviews how erasure coding divides and encodes incoming data into coded chunks, as well as how erasure coding reconstructs the original data from coded chunks.

Erasure coding encodes the original data into coded information, adding data redundancy to tolerate data loss. Modern distributed storage systems focus on erasure codes that are systematic and maximum distance separable (MDS) (e.g., Reed-Solomon codes). Systematic codes preserve the original data in the coded information. An (n, k) systematic code divides the original data into a vector of k data chunks $(D_1, D_2, \ldots, D_k)$ and multiplies it with a k×(n−k) encoding matrix (with the encoding coefficients $c_j^i$, where i and j are the column and row indices, respectively, for $1 \leq i \leq k$ and $1 \leq j \leq n-k$) to linearly combine the data chunks into a vector of (n−k) parity chunks $(P_1, P_2, \ldots, P_{(n-k)})$, as shown in Equation 1. The collection of k data chunks and (n−k) parity chunks are the coded chunks and collectively forms a stripe.

$$\begin{bmatrix} P_1 \\ P_2 \\ \vdots \\ P_{(n-k)} \end{bmatrix} = \begin{bmatrix} c_1^1 & c_1^2 & \cdots & c_1^k \\ c_2^1 & c_2^2 & \cdots & c_2^k \\ \vdots & \vdots & \ddots & \vdots \\ c_{(n-k)}^1 & c_{(n-k)}^2 & \cdots & c_{(n-k)}^k \end{bmatrix} \times \begin{bmatrix} D_1 \\ D_2 \\ \vdots \\ D_k \end{bmatrix} \quad (1)$$

The MDS property of erasure codes guarantees that the data is always recoverable from any k out of n coded chunks. An (n, k) MDS code can always decode any m target chunks $(T_1, T_2, \ldots, T_m)$ in the stripe (where m≤n) by constructing a k×m decoding matrix (with the decoding coefficients $d_j^i$, where i and j are the column and row indices, respectively, for $1 \leq i \leq k$ and $1 \leq j \leq m$) and multiplying it with the k selected coded chunks $(C_1, C_2, \ldots, C_k)$, as shown in Equation 2. Note the linear combination of coded chunks that gives a target chunk (e.g., $T_1 = \Sigma_{i=1}^{k} d_1^i C_i$) is associative (i.e., the summation order of the terms $d_1^i C_i$ does not affect the final outcome $T_1$).

$$\begin{bmatrix} T_1 \\ T_2 \\ \vdots \\ T_m \end{bmatrix} = \begin{bmatrix} d_1^1 & d_1^2 & \cdots & d_1^k \\ d_2^1 & d_2^2 & \cdots & d_2^k \\ \vdots & \vdots & \ddots & \vdots \\ d_m^1 & d_m^2 & \cdots & d_m^k \end{bmatrix} \times \begin{bmatrix} C_1 \\ C_2 \\ \vdots \\ C_k \end{bmatrix} \quad (2)$$

The following shows, for erasure-coded data, the workflows of conventional data repair, which is the current art of data repairing, and hierarchical data repair, which is related to an embodiment of a data processing method on hierarchical data repair disclosed herein.

Figure 1:
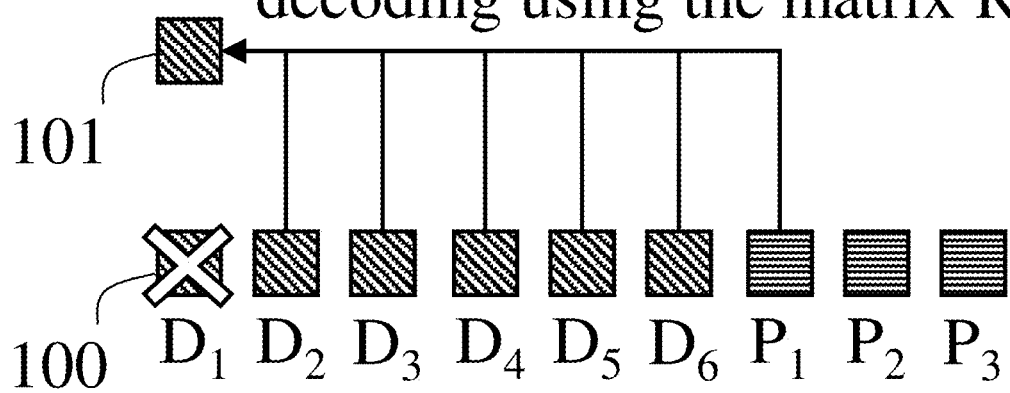
FIG. 1 shows an example of a current art of data repairing method in distributed data storage.

The decoding process also applies to the repair of coded chunks. The conventional repair procedure of erasure-coded data involves a collection of k coded chunks followed by the decoding process. FIG. 1 shows an example of the repair of a lost chunk ($D_1$) 100 under a (9,6) code that requires the gathering of six coded chunks followed by the decoding process using a decoding vector matrix R (where R=[$d^1$ $d^2$ ... $d^6$] and $d^1$, $d^2$, ..., $d^6$ are the decoding coefficients to apply on $D_2$, $D_3$, ..., $D_6$ and $P_1$, respectively), resulting in the repaired chunk 101.

Conventional repair in erasure coding is unaware of hierarchies in storage system architectures, such as racks and clusters in a data center, or data centers in a geographical region. In a hierarchical storage architecture, a storage system can organize coded chunks in groups, where the network resource across groups is much more limited than that within a group. Hierarchical data repair improves the repair performance of erasure-coded storage in such scenarios. The main idea of hierarchical data repair is to first decompose the chunk collection and decoding step by chunk groups to obtain partial decoded results within each group, and then aggregate the partial results across groups for repaired chunks. As hierarchical repair reduces the amount of information to send across groups via intra-group partial decoding, it requires lower inter-group repair bandwidth than conventional repair.

$$D_1 R = [d^1 d^2 \ldots d^6] R_1 = [d^1 d^2] R_2 = [d^3 d^4 d^5] R_3 = [d^6] G_1 =$$
$$R_1 [D_2 D_3]^T G_2 = R_2 [D_4 D_5 D_6]^T G_3 = R_3 [P_1] D_1 = \sum_{i=1}^{3} G_i$$

Figure 2:
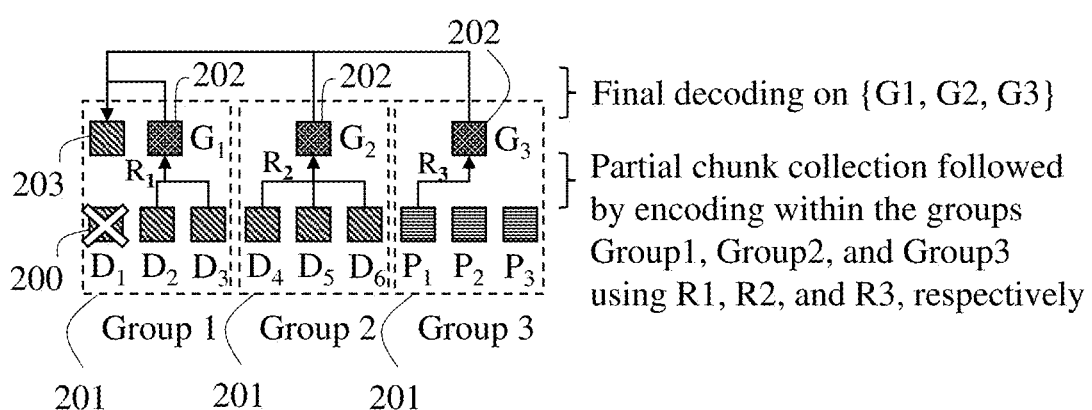
FIG. 2 shows an example of a data repair method according to an embodiment of the presented invention.

FIG. 2 illustrates the major steps in hierarchical repair using a two-stage repair example on data encoded under a (9,6) code. The nine coded chunks are evenly divided into three groups 201. To repair the lost chunk 200, the repair operation first selects six available coded chunks for decoding and constructs the same decoding vector matrix as in conventional repair (i.e.,). According to the selected coded chunks in each group 201, it splits the vector into several sub-vectors for the corresponding groups 201 (for group 1, for group 2, and for group 3). Each group 201 then combines the intra-group coded chunks into a partial decoded chunk 202 using its sub-vector (, and). Finally, the repaired chunk 203 is decoded by combining the partial decoded chunks 202

$$D_1 R = [d^1 d^2 \ldots d^6] R_1 = [d^1 d^2] R_2 = [d^3 d^4 d^5] R_3 = [d^6] G_1 =$$
$$R_1 [D_2 D_3]^T G_2 = R_2 [D_4 D_5 D_6]^T G_3 = R_3 [P_1] D_1 = \sum_{i=1}^{3} G_i().$$

Figure 3:
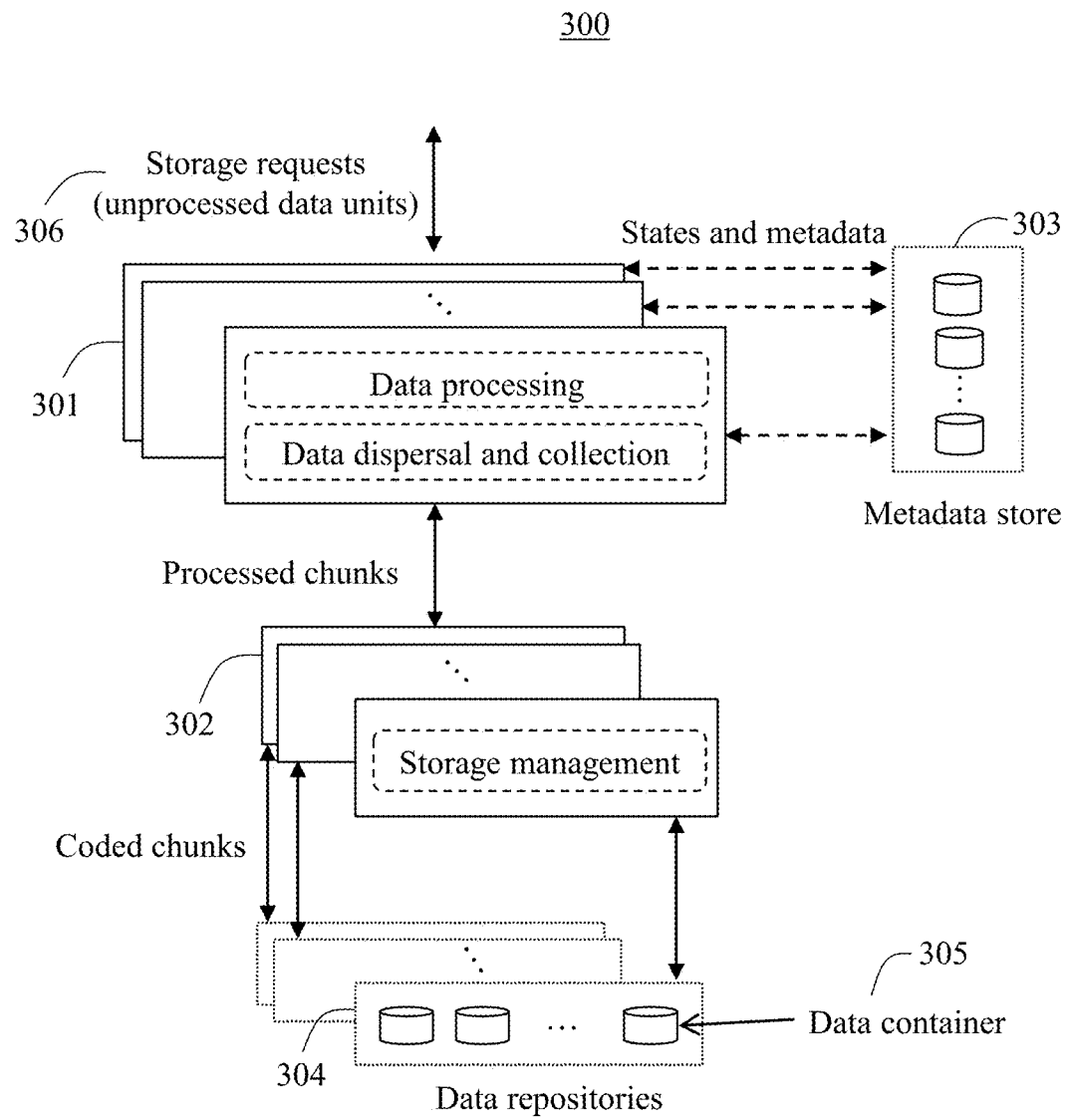
FIG. 3 is a schematic architecture diagram of a data management apparatus according to an embodiment of the presented invention.

The following discloses the composition of one embodiment of a data management apparatus. FIG. 3 depicts a distributed data storage system 300, which comprises proxies 301, agents 302, a metadata store 303, and multiple data repositories 304. A proxy 301 processes data objects for fault tolerance and security. It 301 exchanges processed chunks of data, including coded chunks and partial decoded chunks, with multiple agents 302 over the network. It 301 also stores the metadata and states of data objects in the metadata store 303. Each agent 302 manages a data repository 304 which consists of one or more data containers 305. Specifically, an agent 302 stores, accesses, and processes coded chunks in the containers 305. Each data container 305 contains storage space provisioned from a cloud storage service and belongs to one data repository 304. The exchange of data between a proxy 301 and an agent 302, as well as those between an agent 302 and a data container 305, is by establishing network connections upon the Transmission Control Protocol (TCP) between the entities. The metadata store 303 is a standalone or distributed key-value store, which can alternatively be a database or a synchronization service (such as Zookeeper). Software applications can access data in the system 300 through a proxy 301 by issuing storage requests 306 via storage protocols including network file system protocols (e.g., NFS and CIFS) and object storage protocols (e.g., Amazon S3).

One deployment of the embodiment as a multi-cloud storage system upon multiple clouds is to (i) host one or more proxies 301 and the metadata store 303 in a cloud or on-premises, (ii) form a data repository 304 over all data containers 305 whose storage space is provisioned in the same cloud, and (iii) host one agent 302 in each cloud where a data repository 304 is formed to manage the respective data repository 304. This deployment ensures network traffic for proxies 301 to access metadata and states in the metadata store 303 is always within a cloud, so is the traffic for agents 302 to access coded chunks in its managed data repository 304. Only the network traffic between proxies 301 and agents 302 is across clouds. The benefits of such embodiment are to minimize outbound traffic of clouds that is commonly charged by public clouds for cloud usage fees and leverage the high intra-cloud network bandwidth for one embodiment of a data processing method on hierarchical data repair disclosed.

Another deployment of the disclosed apparatus as a multi-cloud storage system over clouds which are subdivided into regions is to (i) host one or more proxies 301 and the metadata store 303 in a cloud or on-premises, (ii) form a data repository 304 over all data containers 305 whose storage space is provisioned in the same region of a cloud, and (iii) host one agent 302 in each region of all clouds where a data repository 304 is formed to manage the respectively repository 304. In addition to the discussed benefits in the prior deployment, this deployment further reduces the cross-region traffic in clouds (between agents 302 and data containers 305) which is also commonly charged by clouds, e.g., Amazon Web Services and Microsoft Azure.

Figure 4:
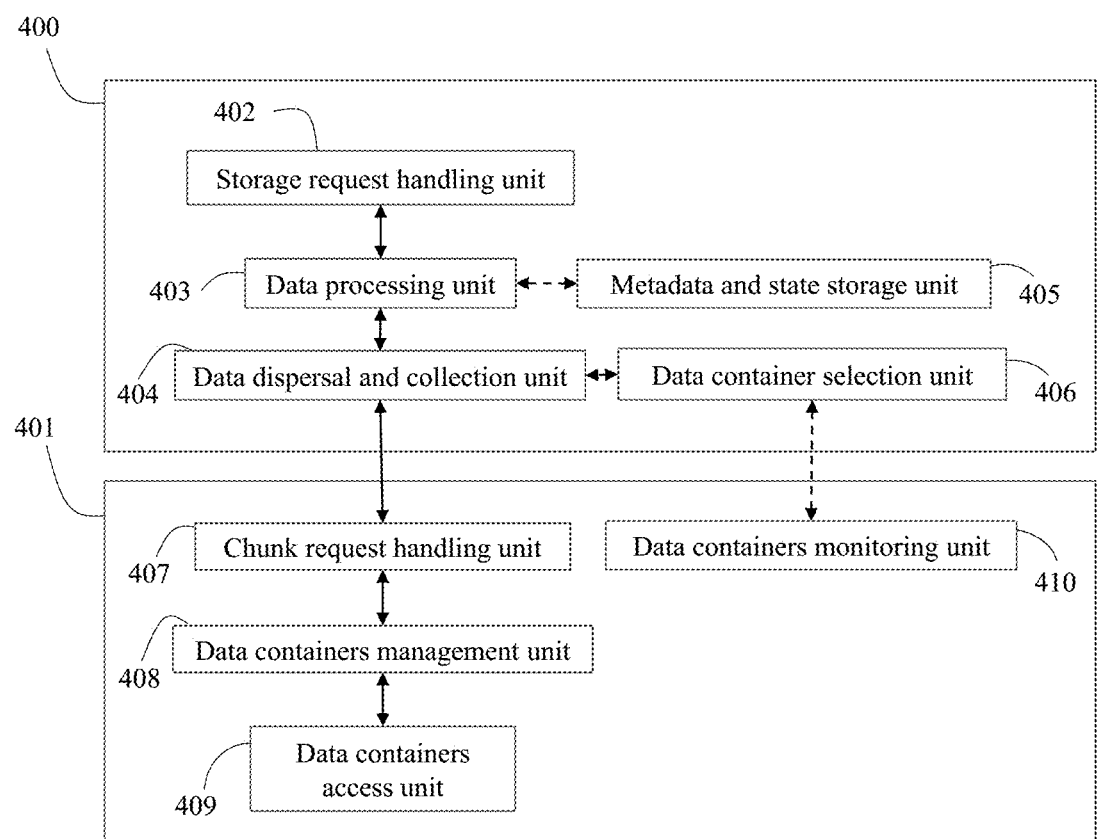
FIG. 4 is a schematic block diagram of a data management apparatus according to an embodiment of the presented invention.

The system 300 adopts a modular design in the entities, where each unit in the entities implements one or more functionalities, including but not limited to, reliability and security mechanisms, placement of coded chunks, access of coded chunks in data containers 305, and inter-entity communication. FIG. 4 depicts the units in a proxy 400 and an agent 401.

A proxy 400 secures data from software applications before forwarding processed data to multiple clouds. In a proxy 400, the storage request handling unit 402 exposes data access to software applications and passes the storage requests 306 on data objects to the data processing unit 403. The data processing unit 403 applies reliability and security mechanisms on data objects for fault tolerance and confidentiality for write requests. Specifically, the data processing unit 403 divides a data object into data units and applies erasure coding to split the data units into chunks upon writes. The data processing unit 403 also reconstructs data units and coded chunks from the available coded chunks for data read and repair, respectively. The data dispersal and collection unit 404 in a proxy 400 distributes and collects chunks over data containers 305 via agents 401. The proxy 400 decides the placement of chunks over data containers 305 according to the applied reliability and security mechanism by querying the data container selection unit 406. The data container selection unit 406 continuously tracks and collects system status information, including the utilization and liveness of data containers 305 and the system loading of agents 401, to deliver informed decisions on chunk placement. Note that the data container selection unit 406 collects status information from agents 401 using a communication path separated from the handling path of storage requests 306 to avoid interference on data processing operations. The metadata and state handling unit 405 persists the metadata and the operational states (e.g., lock/unlock for exclusive write or repair operations) of data objects in the metadata store 303 and handles their access during data processing operations.

An agent 401 manages coded chunk storage at data containers 305 and provides a unified access interface on coded chunks to proxies 400 over the network. In an agent 401, the chunk request handling unit 407 receives chunk requests from a proxy 400 and passes the requests to the data containers management unit 408. The data containers management unit 408 manages one or more data containers 305 in a data repository 304, where each data container 305 is uniquely identified among all agents 401. It 408 accesses coded chunks in data containers 305 through the data containers access unit 409, which handles the cloud-storage-service-specific data access protocols. Upon bootstrap, an agent 401 registers itself and its managed data containers 305 to the designated proxies 400 (as specified by system administrators in a configuration file) through the data containers monitoring unit 410. During runtime, the data containers monitoring unit 410 also handles queries on system status information from the proxies 400. Note that agents 401 operate in a stateless manner, i.e., they 401 keep no state during runtime, and are hence replaceable by new ones upon failures.

The system 300 periodically checks for and repairs lost and corrupted coded chunks. Specifically, proxies 301 store the checksums of coded chunks in the data object metadata upon data write. The system 300 considers coded chunks that are unavailable through any agent 302 as lost, e.g., a data container 305 storing the chunk is unreachable from its respective agent 302, and those with mismatched checksums as corrupted. During a check, a proxy 301 first goes over the metadata of all data objects and identifies the lost coded chunks. To identify corrupted chunks, the proxy 301 also issues batched verification requests on coded chunks to agents 302, which verify the size and checksum of chunks. The proxy 301 then marks all affected data objects in the metadata store 303 for data repair. Note that there is no transfer of chunk data between proxies 301 and agents 302 during the checks and the intervals of checks and repairs are configurable.

The system 300 can scale its storage capacity and the number of clouds 304 by its container-based storage design. To scale out and scale up storage capacity, system administrators add data containers 305 and configure a higher storage capacity to the existing containers 305, respectively. New data containers 305 are assigned to existing or new data repository 304. For example, in a discussed deployment where data containers 305 are assigned to repositories 304 by clouds, new containers 305 in an existing cloud are assigned to the existing repository 304 in the respective cloud, and those 305 in a new cloud forms a new data repository 304 under the management of a new agent 302 in the new cloud. The latter corresponds to a system scale-out to more clouds.

Figure 5:
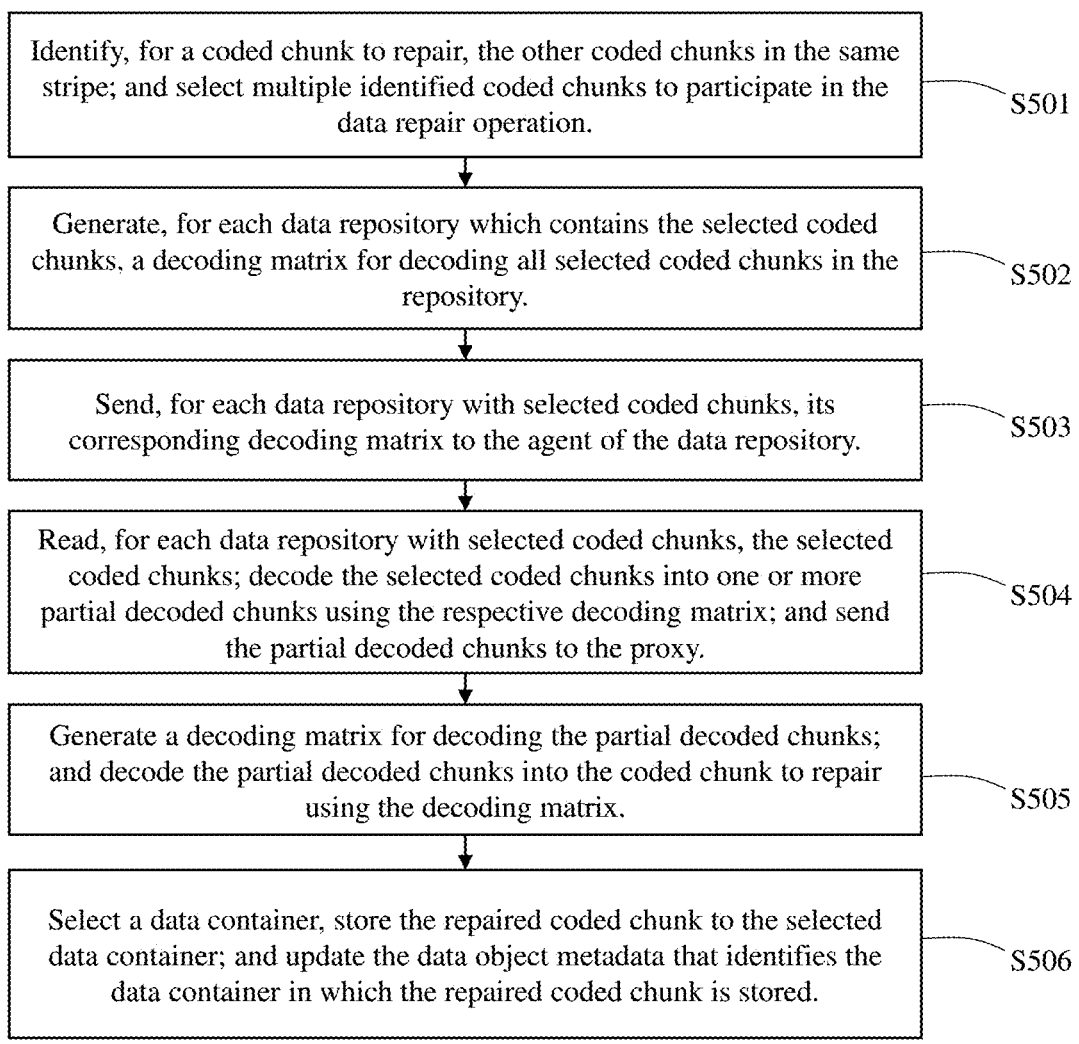
FIG. 5 is a schematic flowchart of a data repair method according to an embodiment of the presented invention.

The following discloses the steps of the first implementation of an embodiment of the hierarchical data repair method 500 with reference to FIG. 5 and an embodiment of a data management apparatus disclosed. In this implementation, a proxy 301 collects the partial decoded chunks generated by agents 302 to reconstruct a lost chunk.

S501. For the coded chunk to repair, a proxy 301 identifies the other coded chunks in the same stripe. The proxy 301 selects multiple identified coded chunks to participate in the data repair operation.

S502. For each data repository 304 which contains the selected coded chunks, the proxy 301 generates a decoding matrix for decoding all the selected coded chunks in the repository 304.

S503. For each data repository 304 with selected coded chunks, the proxy 301 sends the corresponding decoding matrix to the agent 302 of the data repository 304.

S504. For each data repository 304 with selected coded chunks, its agent 302 reads and decodes the selected coded chunks in its data repository 304 into one or more partial decoded chunks using the received decoding matrix. The agents 302 then send the partial decoded chunks to the proxy 301.

S505. The proxy 301 generates a decoding matrix for decoding the partial decoded chunks and decodes the partial decoded chunks from agents 302 into the coded chunk to repair using the decoding matrix.

S506. The proxy 301 selects a data container 305, stores the repaired coded chunk to the selected data container 305, and updates the data object metadata in the metadata store 303 that identifies the data container 305 in which the repaired coded chunk is stored.

Figure 6:
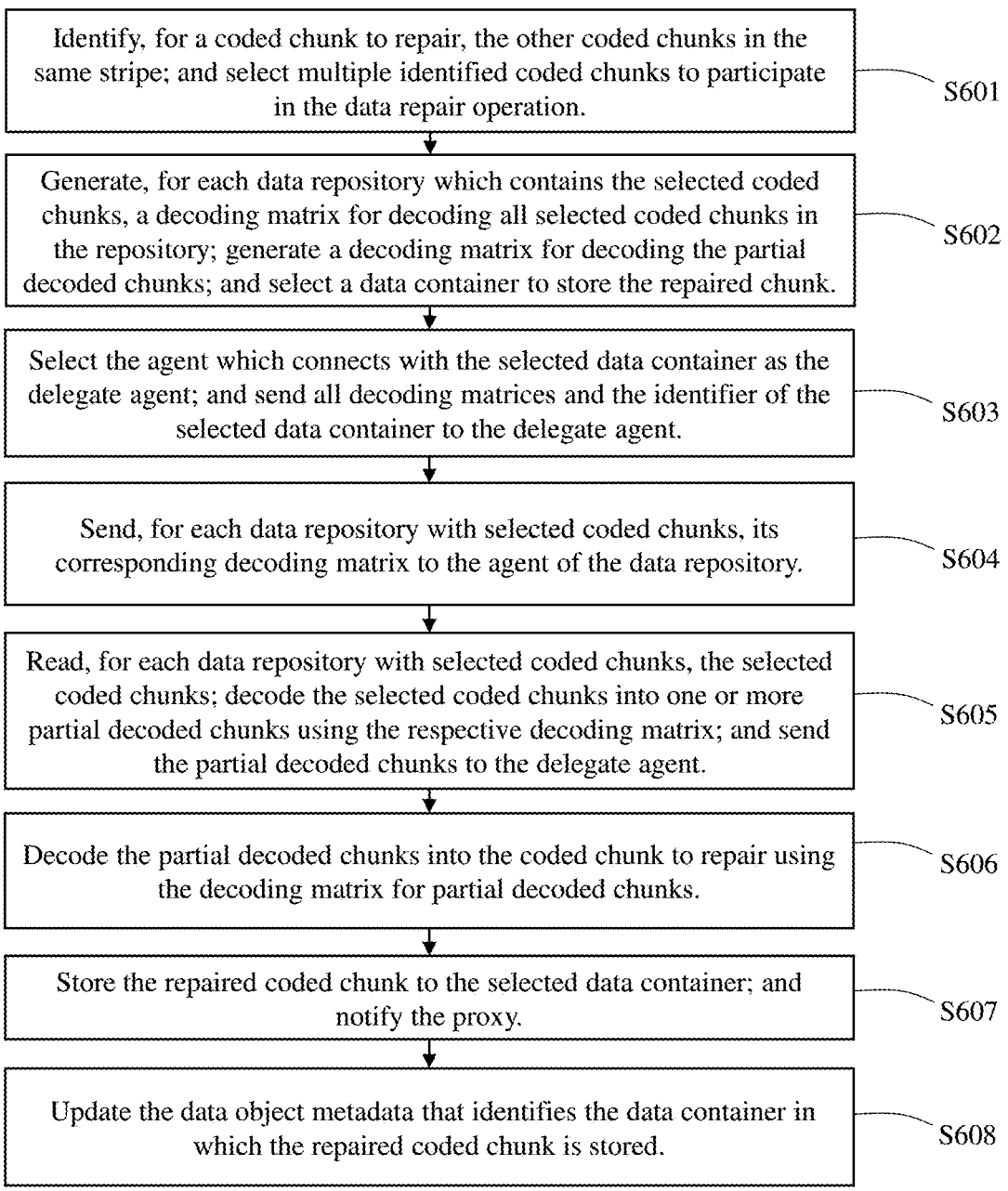
FIG. 6 is a schematic flowchart of a data repair method according to an embodiment of the presented invention.

The following discloses the steps of an alternative implementation of an embodiment of the hierarchical data repair method 600 with reference to FIG. 6 and an embodiment of a data management apparatus disclosed. In this implementation, a proxy 301 delegates the collection of partial decoded chunks and the decoding of the repaired coded chunk to the agent 302 in the cloud where the repaired lost coded chunk will be stored. This implementation eliminates the transfer of chunks between proxies 301 and agents 302.

S601. For the coded chunk to repair, a proxy 301 identifies the other coded chunks in the same stripe. The proxy 301 selects multiple identified coded chunks to participate in the data repair operation.

S602. For each data repository 304 which contains the selected coded chunks, the proxy 301 generates a decoding matrix for decoding all the selected coded chunks in the repository 304. The proxy 301 further generates a decoding matrix for all partial decoded chunks and selects a data container 305 to store the repaired chunk.

S603. The proxy 301 selects the agent 302 which connects with the selected data container 305 as the delegate agent 302. The proxy 301 then sends all decoding matrices and the identifier of the selected data container 305 to the delegate agent 302.

S604. For each data repository 304 with selected coded chunks, the delegate agent 302 sends the corresponding decoding matrix to the agent 302 of the data repository 304.

S605. For each data repository 304 with selected coded chunks, its agent 302 reads and decodes the selected coded chunks in its data repository 304 into one or more partial decoded chunks using the received decoding matrix. The agents 302 then send the partial decoded chunks to the delegate agent 302.

S606. The delegate agent 302 decodes the partial decoded chunks into the coded chunk to repair using the decoding matrix for the partial decoded chunks.

S607. The delegate agent 302 stores the repaired coded chunk to the selected data container 305 and notifies the proxy 301.

S608. The proxy 301 updates the data object metadata in the metadata store 303 that identifies the data container 305 in which the repaired coded chunk is stored.

The following provides the details of an embodiment of data processing and management methods that enable (i) multiple data management configurations and, (ii) future inclusion of new management mechanisms and new cloud storage services.

Figure 7:
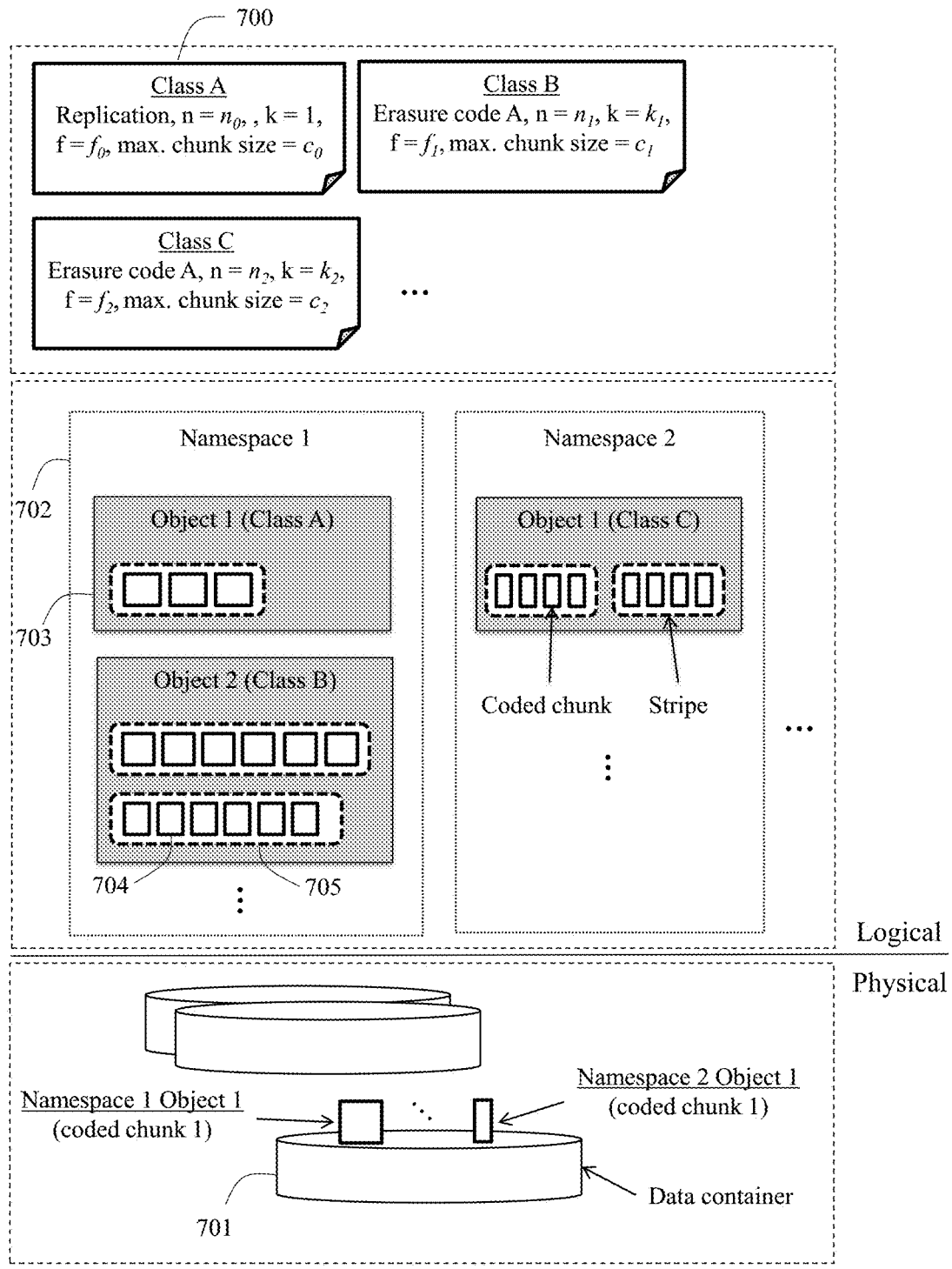
FIG. 7 depicts the data management of a data processing and management method according to an embodiment of the presented invention.

FIG. 7 depicts the data organization of an embodiment of the data processing and management methods. A storage system organizes data as data objects 703 in one or more logical namespaces 702, enabling logical isolation of data objects 703, e.g., among software applications that do not share any data. Upon write, every data object 703 is associated to, uniquely identified within, and visible in only one namespace 702. In a namespace 702, each data object 703 is uniquely identified by a tuple of name and version identifier. An object 703 comprises zero or more coded chunks 704 which are grouped into distinct stripes 705. In a data object 703, each coded chunk 704 uniquely identifies itself by a tuple of chunk number and version identifier. Hence, coded chunks 704 are always identifiable in the system by a tuple of namespace identifier, data object identifier, and chunk identifier, such that coded chunks 704 from distinct namespaces 702 can share a data container 701.

In an embodiment of a data processing and management method disclosed herein that enables multiple data management configurations, every storage management configuration is defined as a storage class 700, which includes a reliability and security level for data objects 703. Each storage class 700 has a unique name and multiple parameters that describe a reliability and security configuration. System administrators provide the definition of storage classes 700, such that they can manage the available reliability and security levels based on external factors, e.g., resource availability and service agreements. Software applications subsequently configure the reliability and security level of each data object 703 by assigning one storage class 700 to the data object 703 on write. The storage class 700 parameters include:

Coding scheme, which specifies the data management mechanism to secure the data and generate data redundancy for fault tolerance, including the widely-adopted erasure coding scheme, Reed-Solomon (RS) codes, variants of erasure coding schemes which combines with secret sharing, and replication;

Coding parameters, n and k, which specify the fault tolerance level of data as defined for erasure coding. For replication, n is the number of replicas and k is set to 1;

Number of agent 302 failures to tolerate, f, which specifies the expected data availability level under the failures of agents 302, in specific to the hierarchical storage architecture supported in one embodiment of a data management apparatus disclosed, where an agent 302 can manage multiple data containers 305 in a data repository 304. The value of f ranges from zero to (n−k). When f=0, the system allows all coded chunks 704 in a stripe 705 be stored under a single agent 302; When 0<f≤(n−k), the system stores at most ⌊(n−k)/f⌋ coded chunks 704 in a stripe 705 under an agent 302. Hence, a zero value means no fault tolerance is required over any agent 302 failure, while a value of (n−k) means tolerating the same number of agent 302 failures as coded chunks 704 in a stripe 705 (i.e., a flat placement of one coded chunk 704 per agent 302); and Maximum chunk size, which controls the maximum size of stripes 705 and hence the partitioning of data objects 703 into data units. The size also presents a tradeoff between batching and parallelizing of data access in data containers 305.

The following shows the data processing interface of data management mechanisms and the data container access interface in an embodiment of a data processing and management method disclosed for enabling future inclusion of new data management mechanisms and new storage services. Details of the interfaces utilization in a distributed data storage system with reference to an embodiment of a data management apparatus disclosed is also provided.

FIG. 8 shows the primitives for passing information across data processing operations. Data management mechanisms pass data across operations as chunks (Chunk) and the control information as coding states (CodingState) and decoding plans (DecodingPlan). Coded chunks 704 and coding states are persisted in data repositories 304 and the metadata store 303, respectively. Decoding plans only last within the data processing session of a storage request. A chunk is the smallest unit of data for data processing operations and is identified by its position within a stripe 705 (id) and its version (version). Each chunk contains a stream of data (data) of finite size (size) and a checksum (checksum) of its data. A coding state contains the optional mechanism-specific information that dynamically changes across data processing operations. Decoding plans are specific to data object read and data recovery operations. A decoding plan comprises a list of selected input chunk positions (inputChunks) for data object read and data object repair, and a decoding matrix (matrix) for data object repair. The decoding matrix size (matrixSize) depends on the reliability configuration and the number of chunks to repair. Note the size of input chunks list may exceed the minimum number of chunks required to retrieve (i.e., k) for the collection of alternative chunks when needed.

Data management mechanisms realize per-stripe data processing before data dispersal to data containers 305, to ensure data reliability and security. FIG. 9 shows the interface of data management mechanisms which comprises three required functions on data processing and a constructor: (i) Encode, which encodes data (data) of a given size (size) into a stripe 705 of coded chunks 704 (stripe) and generate any optional mechanism-specific coding state (state) for subsequent coding operations; (ii) Decode, which takes a list of input chunks (input), a decoding plan (plan), and the optional coding state, to decode either the original data for data decoding or the coded chunks 704 to repair for data repair (decodedData). It optionally takes a list of chunk numbers of the target chunks to repair (targets) for data repair; (iii) Plan4Decode, which generates a decoding plan based on the information on unavailable chunks (failed) and an optional coding state; and (iv) CodingScheme, which is the constructor that takes the coding parameters n and k, and an indicator on whether hierarchical repair applies (useHierRepair). The constructor validates the input coding parameters and aborts on any validation error.

FIG. 10 shows the data container access interface, which is utilized in the data containers access unit 409 to abstract the cloud-storage-service-specific data access protocols from the chunk access logic in the data containers management unit 408. Such abstraction also enables future extensions to support data containers 305 backed by new cloud storage services by adding new interface implementations upon the data access protocols of new cloud storage service. Every implementation of data container access interface realizes several interface calls that access coded chunks 704 and provide storage statistics. The following are the interface calls for coded chunk 704 access: (i) PutChunk, GetChunk, and DeleteChunk, writes, reads, and deletes a coded chunk 704 in a data container 305, respectively; (ii) RevertChunk reverts a coded chunk 704 in a data container 305 to a specific version; and (iii) VerifyChunk verifies the size and data checksum of a coded chunk 704 in a data container 305 against the provided values. All these interface calls report whether the operation succeeded, except VerifyChunk reports the verification result. For data container 305 statistics, GetUsage and GetCapacity report the total size of coded chunks 704 in a data container 305 and the configured storage capacity of a data container 305, respectively.

The following elaborates the operation flows of data processing and management that utilizes the interfaces of data processing operations and data container access, with reference to an embodiment of a disclosed data management apparatus. The flows cover data object write, data object read, data repair, and data object deletion.

FIG. 11 shows the data object write workflow that encodes, distributes, and persists data. First, a proxy 301 exclusively locks the data object metadata in the metadata store 303 to avoid concurrent writes and obtains any existing object metadata from the metadata store 303 (Lines 2-3). It then divides the object data into data units (Line 5) and applies the storage-class-specified coding scheme to each data unit (Lines 6-8). It further selects the data containers 305 for all coded chunks 704 in each stripe 705 and persists the coded chunks 704 to the selected data containers 305 using multiple threads (Lines 9-12). For every chunk write request, the agent 302 verifies the data of the received and stored chunks against the checksum provided by the proxy 301 before and after storing the chunk into a data container 305, respectively, ensuring the integrity of data written to cloud. If the proxy 301 fails to store all coded chunks 704 to the data containers 305 for any stripe 705, it either deletes or reverts every coded chunk 704 written in the current workflow session before aborting (Lines 13-23). Otherwise, it accumulates the stripe-wise metadata (Line 24), updates the object metadata to the metadata store 303 (Lines 26-27), and finally unlocks the object metadata (Lines 28).

FIG. 12 shows the data object read workflow that gathers and decodes coded chunks 704 to reconstruct the object data. A proxy 301 first obtains the object metadata from the metadata store 303 (Line 2). For each stripe 705, it constructs a decoding plan which identifies the input chunk candidates for decoding (Lines 4-8). It then collects sufficient coded chunks 704 from data containers 305 via agents 302 and decodes the data units (Lines 9-14). To ensure data integrity, an agent 302 verifies chunk data from data containers 305 against the checksums provided by the proxy 301, and the proxy 301 also verifies the chunk data received from agents 302. The proxy 301 finally accumulates the decoded data unit to the object data buffer until the data object 703 is reconstructed (Lines 15-16). Note that when a decoding plan contains more than the minimum number of required input chunks (i.e., k), the proxy 301 first runs the step of parallel chunk collection (Lines 9-12) on k coded chunks 704 and continue on the remaining coded chunks until it collects k coded chunks 704 or tries on all coded chunks 704. In addition, the workflow checks for the existence of a decoding plan (after Line 8), sufficient collected coded chunks 704 (after Line 12), and a decoding success (after Line 14), and aborts if any of these conditions fails.

FIG. 13 shows the per-object data repair workflow that recovers lost and corrupted chunks by collecting and decoding alive coded chunks 704 into the repaired chunks, which includes the implementation of the data repair method 500. A proxy 301 starts by locking the object metadata (Line 2), obtaining the latest object metadata from the metadata store 303 (Line 3), and constructing a decoding plan which specifies the input chunks and the decoding matrix to apply on the coded chunks 704 for recovery (Lines 5-8). The proxy 301 considers two repairing cases: when only one coded chunk 704 fails and hierarchical repair applies, the proxy 301 partitions the set of selected coded chunks 704 and the decoding matrix in the decoding plan by data repositories 304, triggers partial decoding in the agents 302, and collects the partial decoded chunks (Lines 11-12, 32-40); Otherwise, it directly collects sufficient alive coded chunks 704 from data containers 305 (Lines 15-17). After that, it decodes the collected chunks for the lost and corrupted chunks (Line 21), which are then stored to some newly assigned and the originally assigned data containers 305, respectively (Lines 22-26). The proxy 301 accumulates the metadata updates and finally updates the object metadata in the metadata store 303 before unlocking the object metadata (Lines 27-30). The repair workflow also detects failure conditions, including (i) no available decoding plan (after Line 8), (ii) insufficient chunks collected (after Lines 19 and 37), (iii) decoding failure (after Line 21), and (iv) repaired chunk storage failure (after Line 25), and unlocks the object metadata before aborting a workflow session. The workflow also detects and skips stripes 705 with no lost or corrupted chunk (after Line 6).

FIG. 14 shows the per-object data repair workflow which includes an alternative implementation of the data repair method 600. A proxy 301 starts by locking the object metadata (Line 2), obtaining the latest object metadata from the metadata store 303 (Line 3), and constructing a decoding plan which specifies the input chunks and the decoding matrix to apply on the coded chunks 704 for recovery (Lines 5-8). When only one coded chunk 704 fails and hierarchical repair applies, the proxy 301 prepares and delegates the repairing to an agent 302 (Line 9). The proxy 301 partitions the set of the selected coded chunks 704 and the decoding matrix in the decoding plan by data repositories 304, constructs a decoding matrix for all partial decoded chunks, and selects the data container 305 to store the repaired chunk (Lines 10-21). The proxy 301 then sends the matrices and the identifier of the selected data container 305 to a delegate agent 302 which manages the selected data container 305 (Line 22). The delegate agent 302 further collects all partial decoded chunks from other agents 302, decodes the repaired chunk, and stores the repaired chunk to the selected data container 305, before notifying the proxy 301 (Lines 31-48). The proxy 301 accumulates the metadata updates and finally updates the object metadata in the metadata store 303 before unlocking the object metadata (Lines 23, 28-29).

FIG. 15 shows the data object deletion workflow that removes the metadata and data of a data object 703. A proxy

301 first locks the object metadata and retrieves the object metadata in the metadata store 303 (Lines 2-3). The proxy 301 then deletes the metadata from the metadata store 303 (Line 4), followed by the alive coded chunks 704 in all stripes 705 in data containers 305 (Lines 5-10). It finally unlocks the object metadata (Line 11).

The following presents the evaluations of a distributed data storage system that implements an embodiment of a data management apparatus disclosed, as well as those of data processing and management methods. The evaluations run on a testbed under workloads generated using the Yahoo! Cloud Serving Benchmark (YCSB). The evaluations study the performance of the system when data is stored under a single storage class 700 and multiple storage classes 700, as well as compare the data repair performance of conventional and hierarchical repair.

The testbed hosts a proxy 301 and a YCSB client on a server equipped with a 12-core Intel Xeon Silver 2.2 GHz CPU and 64 GB RAM. The testbed also hosts one agent 302 and one data repository 304 on each of three servers equipped with a quad-core Intel Core i5 3.4 GHz CPU, 16 GB RAM, a 1 TB SATA HDD, and a 128 GB SATA SSD. All servers are connected to a 10 GbE network switch via one 10 GbE network interface.

In the evaluations, the proxy 301 runs with background data repair disabled by default. For all storage classes 700, the number of agent 302 failures to tolerate and the maximum chunk size are fixed as 1 and 4 MiB, respectively. Each agent 302 manages three data containers 305 over its local SSD for chunk storage. The number of client threads in the YCSB client is set to 8 and the client issues storage requests to the system using the Amazon Simple Storage Service (Amazon S3) protocol. The evaluations run under two reliability configurations, (n=6, k=4) and (n=9, k=6), and two data mechanisms which corresponds to two security settings, encoding with secret sharing disabled (RS) and encoding with secret sharing enabled (RS+SS).

There are three workloads in the evaluations: (i) Write, a write-only workload that inserts 100 GiB data; (ii) Read, a read-only workload that reads 50 GiB data; and (iii) Mixed, a mixed workload with 80% writes and 20% reads, which inserts 40 GiB data and reads 10 GB data. For the read and mixed workloads, the read and write requests follow a Zipfian distribution with a Zipfian constant of 0.99. Each round of performance evaluation always starts with an empty storage system, and then runs the write-only workload, followed by the read-only workload and the mixed workload. The evaluations also show the storage performance of data objects sized from 1 MiB to 256 MiB.

The following evaluation presents the system performance when data is stored under single storage class 700. FIG. 16 shows the aggregate throughput under the three workloads, which generally increases with the increase in data object size, as large data objects 703 consist of larger and more coded chunks 704 which benefit from a higher backend storage throughput for large reads/writes and also sub-operation pipelining in the system implementation. For example, the system throughput can reach 204.2 MB/s, 667.4 MB/s, and 266.2 MB/s for 256 MiB objects under the write-only, read-only, and mixed workloads, respectively, when the reliability configuration is (n=9, k=6) and secret sharing is disabled. We note the write performance is bottlenecked by the data transfer time for Amazon S3 over HTTP, e.g., around 70% of the request latency for 256 MiB objects under a single client thread, a reliability configuration of (n=9, k=6), and secret sharing disabled. Hence, the performance overhead of secret sharing is insignificant under the write-only and the write-dominated mixed workloads, whereas the throughput drops up to 19.7% under the read-only workload when secret sharing is enabled.

Figure 17:
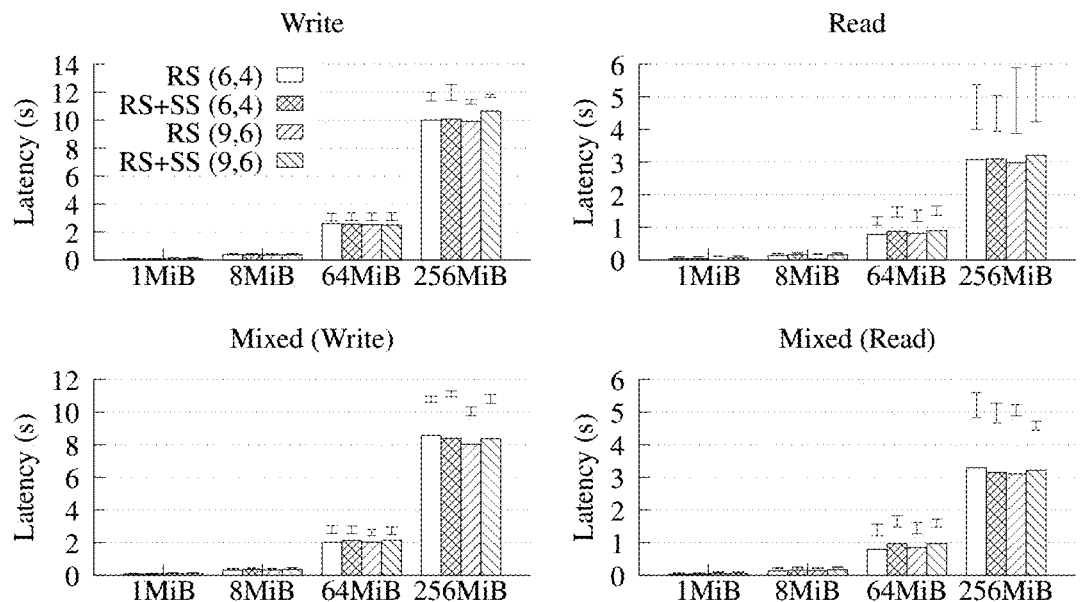
FIG. 17 is a performance evaluation result of a data management apparatus implementation according to an embodiment of the presented invention.

FIG. 17 shows the request latencies under the three workloads. Specifically, the boxes show the average latencies, while the lower and upper ends of the error bars indicate the 95th and 99th percentile latencies, respectively. The trend of average latencies overall aligns with that of throughputs in FIG. 16. When secret sharing is enabled, the 95th and 99th percentile latencies are slightly higher in general for the same data object size across workloads. Note the write latency under the mixed workload can be up to 16.2% lower than that under the write-only workload for large objects, e.g., 256 MiB, as fewer writes concurrently compete for network resources.

Figure 18:
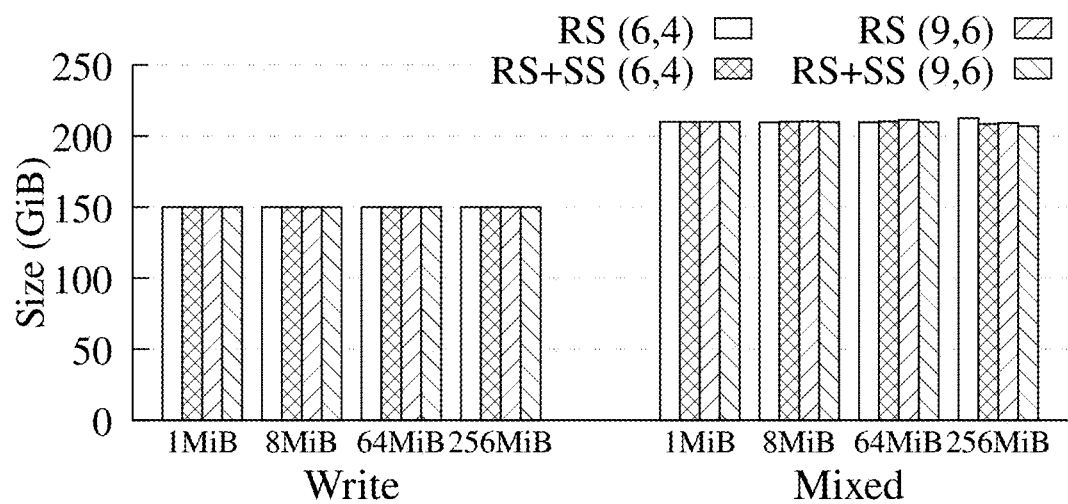
FIG. 18 is an evaluation result on storage usage of a data management apparatus implementation according to an embodiment of the presented invention.

FIG. 18 shows the raw storage usage after the write-only and mixed workloads. The raw storage usage after both workloads matches the expected overhead of 1.5× of the total logical size of data objects across storage settings, implying the storage overhead for secret sharing is insignificant. Note the storage usage after the mixed workload varies across reliability configurations and security settings, especially for large objects, as the actual number of inserts issued by the YCSB client differs across runs.

Figure 19:
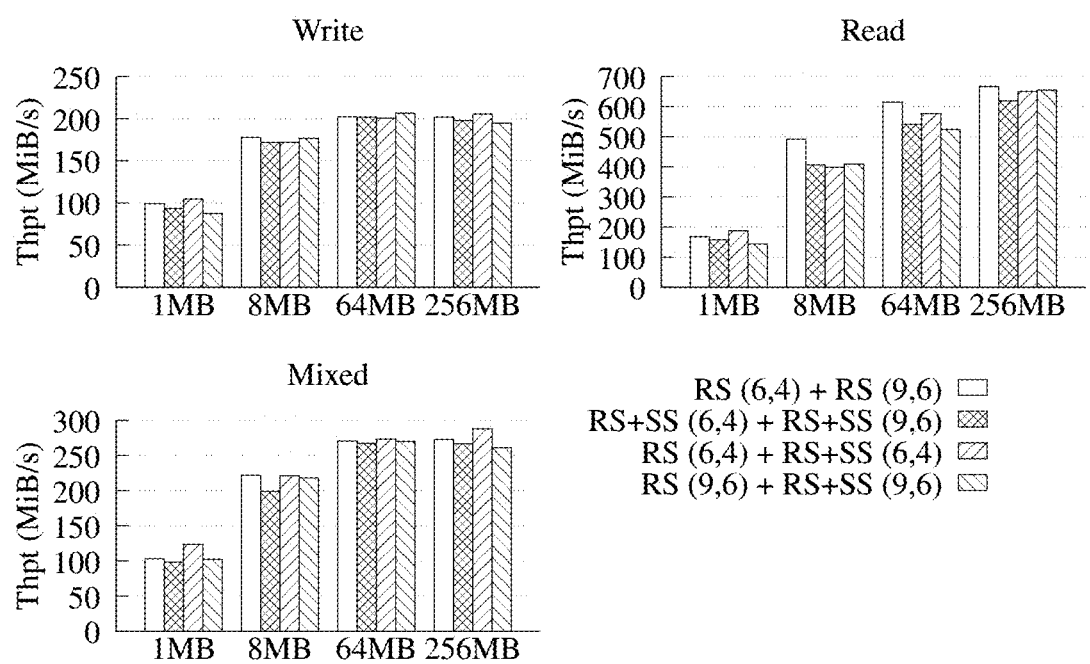
FIG. 19 is a performance evaluation result of a data management apparatus implementation according to an embodiment of the presented invention.
Figure 20:
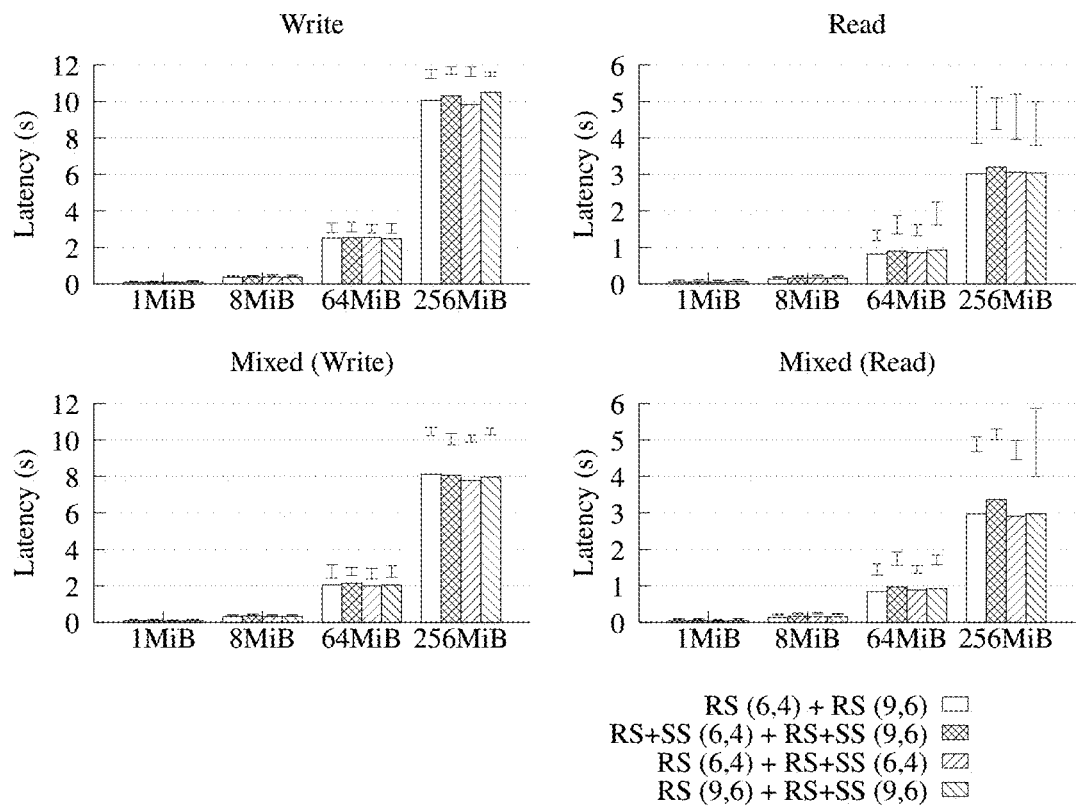
FIG. 20 is a performance evaluation result of a data management apparatus implementation according to an embodiment of the presented invention.
Figure 21:
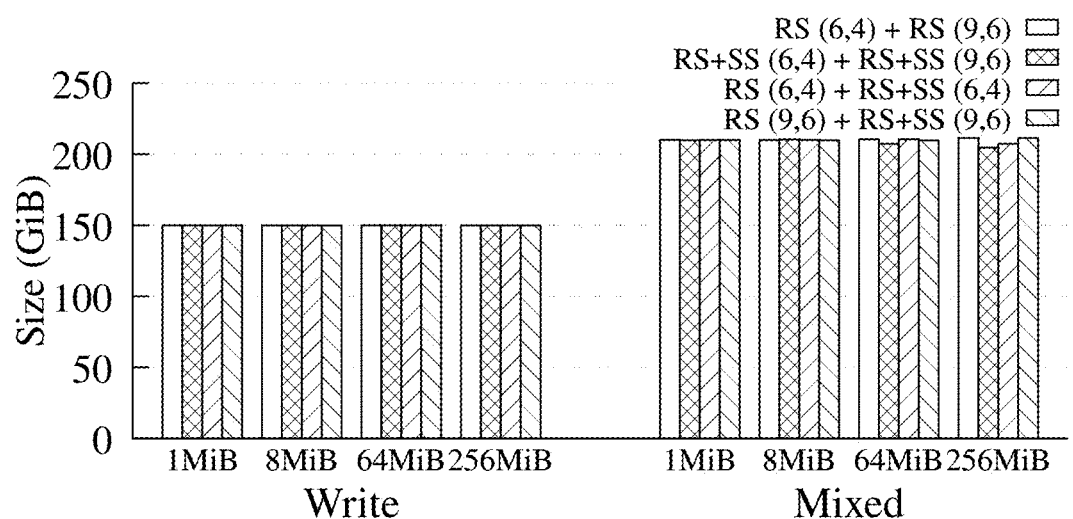
FIG. 21 is an evaluation result on storage usage of a data management apparatus implementation according to an embodiment of the presented invention.

The following evaluation further studies the system performance under different mixes of storage classes 700. It considers four combinations of storage settings, in which each setting is specified as one storage class 700: (i) RS (n=6, k=4) and RS (n=9, k=6); (ii) RS+SS (n=6, k=4) and RS+SS (n=9, k=6); (iii) RS (n=6, k=4) and RS+SS (n=6, k=4); and (iv) RS (n=9, k=6) and RS+SS (n=9, k=6). Note the first two combinations have the same security setting but different reliability configurations, and vice versa in the remaining two combinations. The YCSB client randomly assigns one of the two storage classes 700 to a data object upon write. FIG. 19, FIG. 20, and FIG. 21 show the performance results on aggregate throughput, storage request latencies, and raw storage usage, respectively. Both the throughput and request latencies under different combinations are in the range of those of the respective storage classes 700 in the prior evaluation under a single storage class 700. Also, the raw storage usage remains around 1.5× of the total logical data size. Hence, the results show the use of storage classes 700 imposes negligible overhead to the overall system performance, while supporting multiple storage management configurations in the system.

The following evaluation compares the data repair performance of conventional and hierarchical repair. Each run executes the write-only workload to insert 100 GiB data, cleans the coded chunks 704 in a data container 305 to simulate data loss, and enables the background data repair in the system to detect and recover the lost data. To simulate data repair under constrained network environment between proxies 301 and agents 302, e.g., when the proxies 301 are on-premises and the agents 302 run in clouds, the network interfaces of the servers hosting the agents 302 run at the speed of 1 Gbps (instead of 10 Gbps by default) in this evaluation. The evaluation was conducted with the reliability configuration set to (n=9, k=6) and secret sharing set to disabled. Note the repair process is the same regardless of the security settings, as data repair does not require any transformation reversion for secret sharing in the system.

Figure 22:
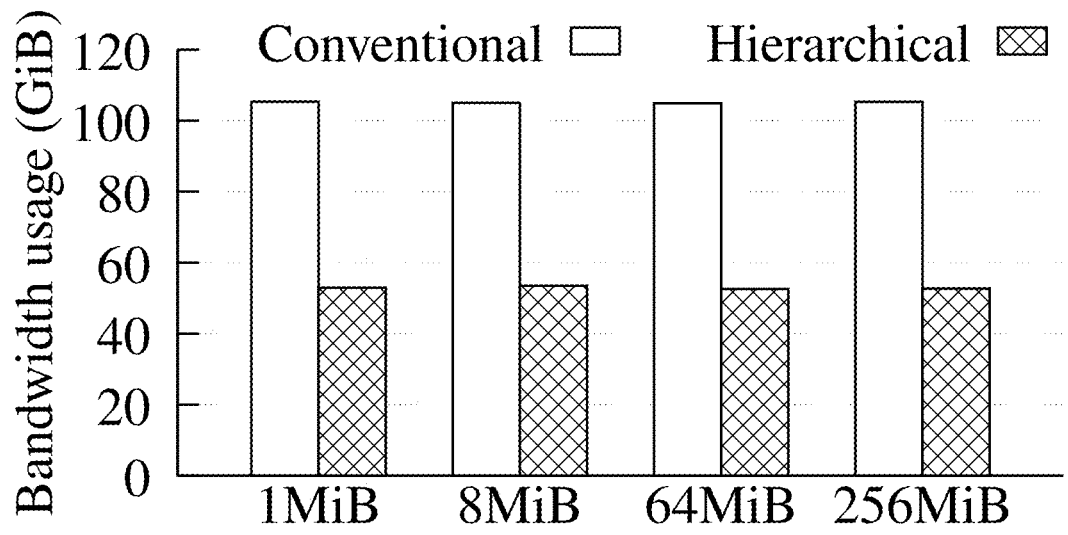
FIG. 22 is an evaluation result on the network bandwidth usage in a data repair of a data management apparatus implementation according to an embodiment of the presented invention.

FIG. 22 shows the ingress network bandwidth usage of the proxy 301 during data repair. As shown in FIG. 22, hierarchical repair reduces half of the network bandwidth usage in conventional repair across object sizes, as the proxy 301 collects a total of six and three chunks from the agents 302 in conventional and hierarchical repair, respectively.

Figure 23:
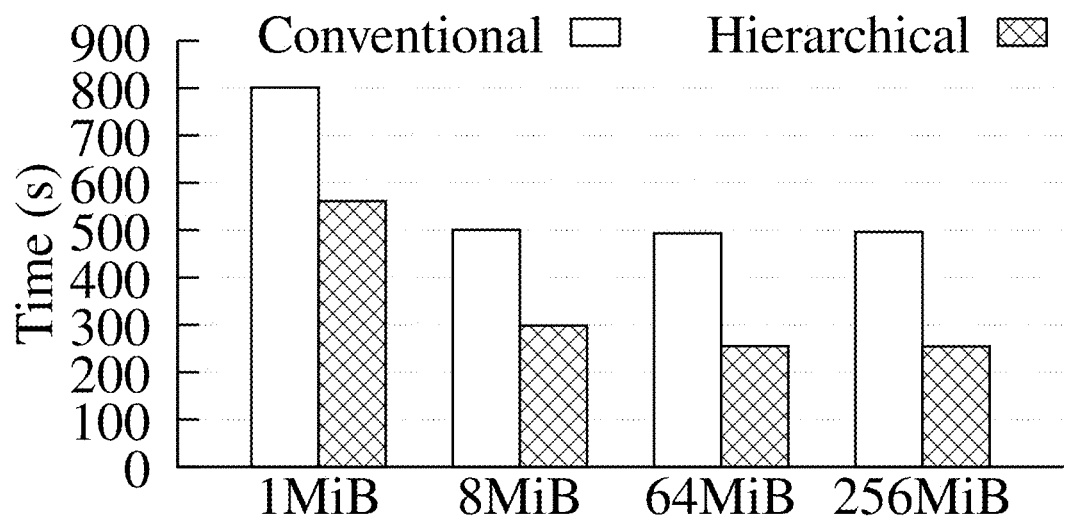
FIG. 23 is an evaluation result on data repair time of a data management apparatus implementation according to an embodiment of the presented invention.

FIG. 23 shows the time to complete the data repair and hierarchical repair speeds up the data repair by 29.9-48.7% over conventional repair. In summary, the results show the data repair method disclosed improves data repair performance in hierarchical erasure-coded distributed data storage systems over the current art.

What is claimed:

1. A data management system, comprising:
one or more proxies;
a plurality of agents;
a plurality of data containers; a metadata store;
a plurality of networks;
wherein each of the said plurality of agents is connected with the said one or more proxies by one or more networks in the said plurality of networks;
wherein each of the said plurality of agents is connected with each other by one or more networks in the said plurality of networks;
wherein each of the said plurality of agents is connected with one or more of the said plurality of data containers by one or more networks in the said plurality of networks;
wherein the said one or more proxies are connected with the said metadata store by one or more networks in the said plurality of networks;
wherein the said one or more proxies are configured to: accept data storage requests, divide data in the data storage requests into units, apply data processing on the data in the data storage requests to generate processed chunks of data, disperse the processed chunks of data to one or more agents, revert or delete the stored processed chunks of data in the said plurality of data containers if the proxy fails to store all processed chunks of data from a data unit, and reply to a received data storage request;
wherein the said one or more proxies are further configured to: decide the processed chunks of data to retrieve from the said plurality of data containers, decode the chunks of data received from the said plurality of agents into the decoded chunks of data, and reply to a storage request with the decoded data;
wherein the said one or more proxies are further configured to send the decoded chunks of data to one or more agents in the said plurality of agents;
wherein the said one or more proxies are further configured to: record the checksums of processed chunks of data in the said metadata store, scan all or part of the metadata in the said metadata store at a pre-configured interval of time to identify the processed chunks of data in the said plurality of data containers that are not available through any of the said plurality of agents or whose checksums do not match the ones stored in the said metadata store, mark the identified chunks in the said metadata store, and trigger a data repair method to repair the chunks marked in the said metadata store;
wherein the said plurality of agents is configured to: receive processed chunks of data from the said one or more proxies, store the received chunks of data into one or more of the said plurality of data containers, and revert or delete the processed chunks of data in one or more containers in the said plurality of data containers;
wherein the said plurality of agents is further configured to: retrieve chunks of data from one or more containers in the said plurality of data containers, and send the chunks of data to a said proxy;
wherein the said plurality of agents is further configured to: check the storage utilization of a said data container, and report the storage utilization and storage capacity of a said data container;
wherein the said plurality of agents is further configured to: encode the retrieved chunks of data, send the encoded chunks of data to a said proxy or a said agent, and decode chunks of data received from the said plurality of agents into decoded chunks of data;
wherein the said metadata store is configured to store the states and metadata of data managed by the system;
wherein each of the said plurality of data containers contains storage space provisioned from a cloud storage service that provides data access through file-based or object-based storage protocols;
wherein the said plurality of data containers is configured to store the processed chunks of data in the system; and
wherein each of the said plurality of data containers is further configured with an identifier that is unique among all the said plurality of agents.

2. The system of claim 1, wherein each of the said plurality of agents is further to configured to:
run in a distinct cloud; and
connect with only the data containers in the said plurality of data containers which are provisioned from the cloud storage services in the same cloud by a said network.

3. The system of claim 1, wherein
the said one or more proxies are configured to apply reliability and security mechanisms on data in storage requests using the data processing operation interface comprising:
a definition of chunks which comprises a chunk identifier, a byte buffer, a size of the byte buffer, a version identifier, and a data checksum;
a definition of coding state which comprises a finite-size buffer of bytes; a definition of decoding plan which comprises a coding matrix, a size of the coding matrix, and a list of chunk identifiers;
a store-data interface which takes a finite-sized byte buffer of data as input and outputs a list of chunks and optionally a coding state;
a plan-decode interface which takes a list of chunk identifiers of unavailable processed chunks of data, an optional coding state, and an indicator on whether the planned subsequent data processing operation is a data repair, and outputs a decoding plan and an optional coding state;
a decode-data interface which takes a list of chunks, a decoding plan, an optional coding state, and an optional list of chunk identifiers of target chunks to decode as input, and outputs a finite-sized buffer of data and an optional coding state; and
the said one or more agents are further configured to store the processed chunks of data, retrieve the processed chunks of data, and revert or delete the processed chunks of data in one or more containers using the data container access interface comprising:
a definition of chunks which comprises a chunk identifier, a byte buffer, a size of the byte buffer, a version identifier, and a data checksum;
a store-chunk interface which takes a chunk as input and stores the chunk into a said data container;
a get-chunk interface which takes a chunk whose size of data in the byte buffer is zero as input, reads the data of the chunk from a said data container, fills the byte buffer of the chunk with data read, sets the size of data in the byte buffer of the chunk to the length of data read, and outputs the chunk;
a revert-chunk interface which takes a chunk whose size of data in the byte buffer is zero, and reverts the chunk in a said data container to the version specified in the chunk; and
a delete-chunk interface which takes a chunk whose size of data in the byte buffer is zero, and deletes the chunk in a said data container.

4. The system of claim 1, wherein
each of the said one or more proxies further comprises:
storage request handling unit which is configured to expose access to data managed in the system to software applications;
a data processing unit which is configured to: apply reliability and security mechanisms on data in storage requests received from the storage request handling unit, by dividing data into data units and applying coding to split each data unit into chunks upon data write, reconstruct data units from processed chunks of data upon data read, and reconstruct processed chunks of data from processed chunks of data upon data repair;
a metadata and state storage unit which is configured to: persist the metadata of data units to the said metadata store, and persist the operational state of data units to the said metadata store;
a data dispersal and collection unit which is configured to: disperse processed chunks of data to the said plurality of agents, and collect processed chunks of data from the said plurality of agents; and
data container selection unit which is configured to: collect system status information, including but not limited to the utilization and liveness of the said plurality of data containers over time, record the collected system status information, and deliver decisions on the placement of processed chunks of data across the said plurality of data containers; and
each of the said plurality of agents further comprises:
a chunk request handling unit which is configured to: receive requests on processed chunks of data from the said one or more proxies, and reply to the received requests on processed chunks of data;
data containers management unit which is configured to: track one or more containers in the said plurality of data containers which are connected with the agent;
data containers access unit which is configured to: store, retrieve, encode, and remove processed chunks of data in the said plurality of data containers which are connected with the agent; and
data containers monitoring unit which is configured to: send the information on the set of one or more containers in the said plurality of data containers which is connected with the agent to the said one or more proxies during agent bootstrap, and handle system status queries from the said one or more proxies.

5. The system of claim 1, wherein the said one or more proxies and the said plurality of agents are further configured to:
maintain separate namespaces for logical isolation of data among software applications;
identify each namespace with a unique identifier;
identify, in a namespace, each data objects with a unique name and a version identifier;
identify, in a data object, each processed chunk of data with a unique identifier and a version identifier; and identify, in the system, each processed chunk of data with a tuple of the unique identifier and the version identifier of the chunk, the unique name and the version identifier of a data object, and a namespace identifier.

6. A method for data repairing, comprising:
identifying, for a chunk of data to repair, the other chunks of data in the same stripe;
selecting the set of identified chunks to participate in the data repair operation; dividing the selected set of chunks into groups;
computing, for each group of selected chunks, a decoding matrix for encoding all the selected chunks in the group;
retrieving, for each group of selected chunks, the selected chunks from storage;
encoding, for each group of selected chunks, the selected chunks into one or more partial decoded chunks by applying the decoding matrix generated for the respectively group;
computing a final decoding matrix for decoding the partial decoded chunks from the selected groups; and
applying the final decoding matrix on the partial decoded chunks to decode the said chunk of data to repair.

7. The method according to claim 6, wherein
first means executes the said first to fourth steps;
the said first means sends, for each said group of selected chunks, the corresponding said decoding matrix to a second means after executing the said fourth step;
one or more of the said second means execute the said fifth and sixth steps after receiving a said decoding matrix from the said first means;
one or more of the said second means send the said partial decoded chunks to the said first means after executing the said sixth step;
the said first means executes the said seventh and eighth steps after receiving the partial decoded chunks from the said one or more second means;
a plurality of data containers which contain storage space provisioned from cloud storage services constitutes the storage space of the said storage for chunks;
each of the one or more said second means has access to a distinct set of data containers in the said plurality of data containers; and
the division of the set of said identified chunks in the said third step is by the distinct sets of data containers which the said one or more second means have access to.

8. The method according to claim 6, wherein
a first means executes the said first to fourth steps and the seventh step;
the said first means, after executing the seventh step, selects a second means to which the said first means sends the decoding matrices for all said groups of selected chunks and the decoding matrix for all partial decoded chunks;
the said selected second means sends, for each said group of selected chunks, the corresponding said decoding matrix to a third means;
one or more of the said third means execute the said fifth and sixth steps after receiving a said decoding matrix for each said group of selected chunks from the said selected second means;
the said one or more third means send the said partial decoded chunks to the selected second means after executing the said sixth step;
the selected second means, after receiving the said partial decoded chunks, executes the said eighth step and notifies the said first means;

a plurality of data containers which contain storage space provisioned from cloud storage services constitutes the storage space of the said storage for chunks;

each of the one or more said third means has access to a distinct set of data containers in the said plurality of data containers;

the division of the set of said identified chunks in the said third step is by the distinct sets of data containers which the said one or more third means have access to; and the said second means can be a said third means among the said one or more of the third means.

9. The method according to claim 6, further including the steps of selecting a data container among a plurality of data containers which contain storage space provisioned from cloud storage services and constitute the storage space of the said storage for chunks;

storing the repaired chunk to the said selected data container; and updating the metadata that identifies the said data container in which the repaired chunk is stored.

10. A method for data processing and management, comprising:

defining one or more storage management configurations for data to store;

accepting a defined storage management configuration to be specified in a storage request with data;

encoding the data in a storage request according to the specified storage management configuration to generate processed chunks of data;

storing the processed chunks of data into a plurality of data containers which contain storage space provisioned from cloud storage services;

storing the specified storage management configuration along the metadata of the processed chunks of data in a metadata store;

retrieving, for data units requested in a storage request, along with the said metadata, the said storage management configuration from the said metadata store which has been applied on the requested data units;

selecting the set of said processed chunks of data generated from the requested data units to retrieve;

retrieving the selected processed chunks of data from the said plurality of data containers;

decoding the requested data units using the selected processed chunks of data according to the retrieved storage management configuration;

replying to the storage request with the decoded data units; and wherein the said storage management configuration definition comprises:

a coding scheme which specifies a data processing method to generate the said processed chunks of data for fault tolerance and security, including but not limited to erasure coding schemes, methods which combine erasure coding schemes and secret sharing, and replication;

a coding parameter n, which specifies the total number of said processed chunks generated by a coding scheme;

a coding parameter k, which specifies the minimum number of required said processed chunks to recover the data after applying a coding scheme;

a parameter on the maximum size of each said processed chunk of data generated by a coding scheme; and a parameter f which specifies the number of failures of a first means to tolerate, where each of the said first means is connected with a distinct set of containers in the said plurality of data containers and executes the fourth and eighth steps of the storage access of the said processed chunks of data in the said plurality of data containers.

* * * * *